(12) United States Patent
Taniguchi et al.

(10) Patent No.: US 7,850,069 B2
(45) Date of Patent: Dec. 14, 2010

(54) OPERATION SUPPORT SYSTEM

(75) Inventors: Shinichiro Taniguchi, Tokyo (JP); Kenji Ebitani, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/417,499

(22) Filed: Apr. 2, 2009

(65) Prior Publication Data
US 2010/0065624 A1 Mar. 18, 2010

(30) Foreign Application Priority Data
Sep. 18, 2008 (JP) ............... 2008-239750

(51) Int. Cl.
*G06F 7/00* (2006.01)
*G06F 17/00* (2006.01)
*G06F 9/46* (2006.01)
(52) U.S. Cl. ............... 235/375; 235/376; 705/9
(58) Field of Classification Search ............ 235/375, 235/376
See application file for complete search history.

(56) References Cited

U.S. PATENT DOCUMENTS
| | | | |
|---|---|---|---|
| 5,449,895 A | 9/1995 | Hecht | |
| 6,502,756 B1 | 1/2003 | Fahraeus | |
| 6,548,768 B1 | 4/2003 | Pettersson | |
| 2006/0007189 A1 * | 1/2006 | Gaines et al. | 345/179 |
| 2007/0023523 A1 | 2/2007 | Onishi | |
| 2007/0136121 A1 | 6/2007 | Katsurabayashi | |
| 2008/0154685 A1 * | 6/2008 | Matsuda | 705/8 |

FOREIGN PATENT DOCUMENTS
| | | |
|---|---|---|
| JP | 07-225803 A | 8/1995 |
| JP | 2004-054364 A | 2/2004 |
| JP | 2004-265140 A | 9/2004 |
| JP | 2007-041691 A | 2/2007 |
| JP | 2007-164224 A | 6/2007 |

* cited by examiner

*Primary Examiner*—Michael G Lee
*Assistant Examiner*—Laura Gudorf
(74) *Attorney, Agent, or Firm*—Sughrue Mion, PLLC

(57) ABSTRACT

An operation support system includes a progress information providing unit, an entry device, and an updating unit. The progress information providing unit stores progress information indicating to which operation stage an operation procedure has progressed and provides the progress information in response to a request made from an external device. The entry device includes an entry tool and a reading device. The entry tool makes an entry into a paper form associated with the operation procedure. When an entry is made into an entry field of the paper form using the entry tool, the reading device reads identification information presented in the entry field. The updating unit updates the progress information, which is stored in the progress information providing unit, based on an operation stage associated with the identification information, which is read from the entry field by the reading device.

8 Claims, 21 Drawing Sheets

*AccDept: abbreviation of "Accounting Department"

*AccDept: abbreviation of "Accounting Department"

FIG. 4

| Flow type ID | Flow type name | Step ID (Field ID) | Step name | Step condition |
|---|---|---|---|---|
| 01 | Internal approval document for purchase | 001 | Drafting | — |
| | | 002 | First approval | Group leader |
| | | 003 | Manager approval | Manager |
| | | 004 | Settlement | General manager |

FIG. 8

| Stamp ID | User ID |
|---|---|
| fx001 | 001234 |
| fx002 | 001235 |
| fx003 | 001236 |
| fx004 | 001237 |
| XXXXX | 000000 (rejected) |
| ⋮ | ⋮ |

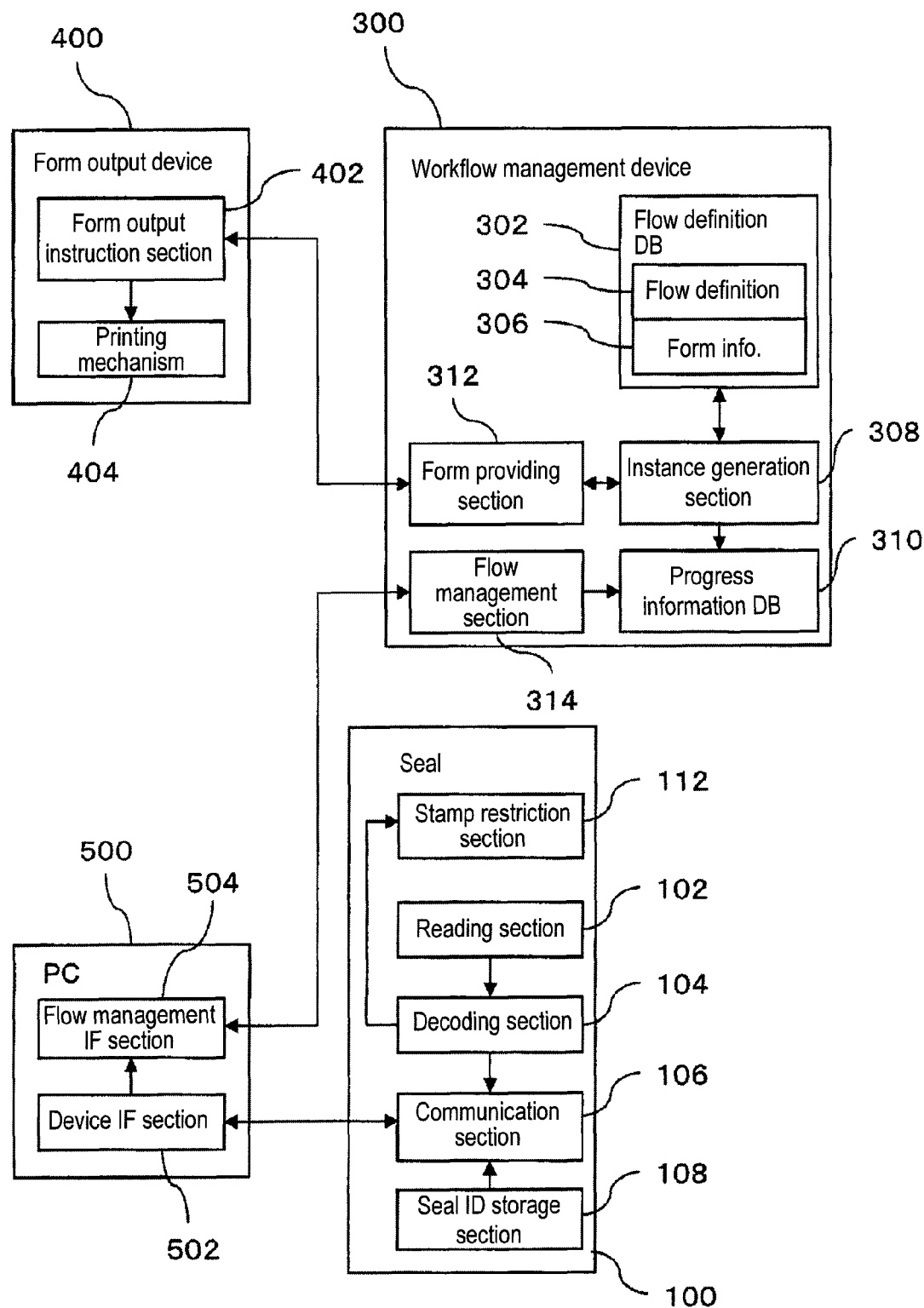

Internal Request for Approval

Route of sending around: drafter > G leader > Manager > Plan management leader > Department leader

| Subject Matter | Drafter | GL | Manager | Settlement |
|---|---|---|---|---|
| Purchase of FPGA | | | | |

(x3, y3)  (x5, y5)  (x7, y7)  (x9, y9)
(x4, y4)  (x6, y6)  (x8, y8)  (x10, y10)

| Drafting Date | April 10, 2007 | Draft No. | * |
|---|---|---|---|

| Group | xxxx G | Theme. | | project |
|---|---|---|---|---|

| Purchase item | Quantity | Estimation |
|---|---|---|
| FPGA by ABC corp. | 3 | $2148.00 |

| Order destination | Delivery deadline | Rental period |
|---|---|---|
| XYZ Inc. | April 17 | |

Reasons for request xxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxx
xxxxxxxxxxxxxxxxxxxxxxxx.

Relation with the budget           PAS comments

| Attachment | |
|---|---|

| Field ID | Name | Upper left coordinate | Lower right coordinate |
|---|---|---|---|
| f11 | Entire form | (x1,y1) | (x2,y2) |
| f12 | Drafter | (x3,y3) | (x4,y4) |
| f13 | Approval by group leader | (x5,y5) | (x6,y6) |
| f14 | Approval by manager | (x7,y7) | (x8,y8) |
| f15 | Settlement | (x9,y9) | (x10,y10) |

FIG. 20A
FIG. 20B
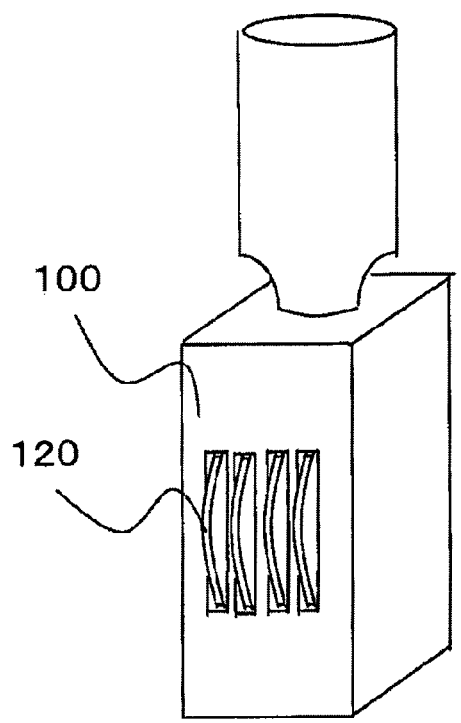
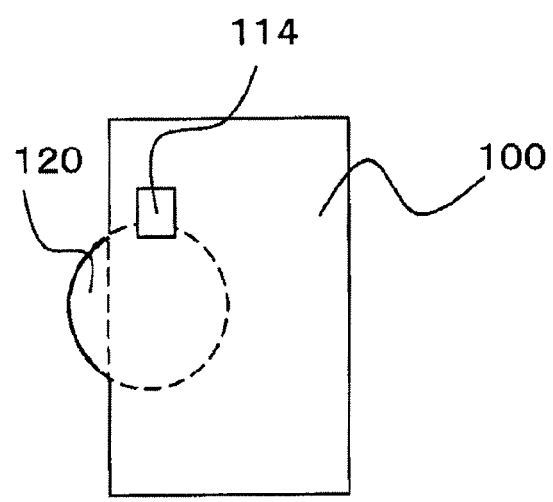

OPERATION SUPPORT SYSTEM

CROSS-REFERENCE TO RELATED APPLICATIONS

This application is based on and claims priority under 35 USC 119 from Japanese Patent Application No. 2008-239750 filed on Sep. 18, 2008.

BACKGROUND

Technical Field

The invention relates to an operation support system.

SUMMARY

According to an aspect of the invention, an operation support system includes a progress information providing unit, an entry device, and an updating unit. The progress information providing unit stores progress information indicating to which operation stage an operation procedure has progressed and provides the progress information in response to a request made from an external device. The entry device includes an entry tool and a reading device. The entry tool makes an entry into a paper form associated with the operation procedure. When an entry is made into an entry field of the paper form using the entry tool, the reading device reads identification information presented in the entry field. The updating unit updates the progress information, which is stored in the progress information providing unit, based on an operation stage associated with the identification information, which is read from the entry field by the reading device.

BRIEF DESCRIPTION OF THE DRAWINGS

Exemplary embodiments of the invention will be described in detail below with reference to the accompanying drawings, wherein:

FIG. 4 is a diagram for explaining an example of a flow definition;

FIG. 8 is a diagram illustrating exemplary information of an association relation between seal IDs and user IDs;

FIG. 11 is a diagram illustrating a system configuration example according to a second modification example;

FIG. 12 is a diagram illustrating an example of a form according to a third modification example;

FIG. 13 is a diagram illustrating exemplary field information in the third modification example;

FIG. 20A is a perspective view illustrating an example of a seal according to a sixth modification example;

FIG. 20B is a side view illustrating the seal according to the sixth modification example;

DETAILED DESCRIPTION

Figure 1:
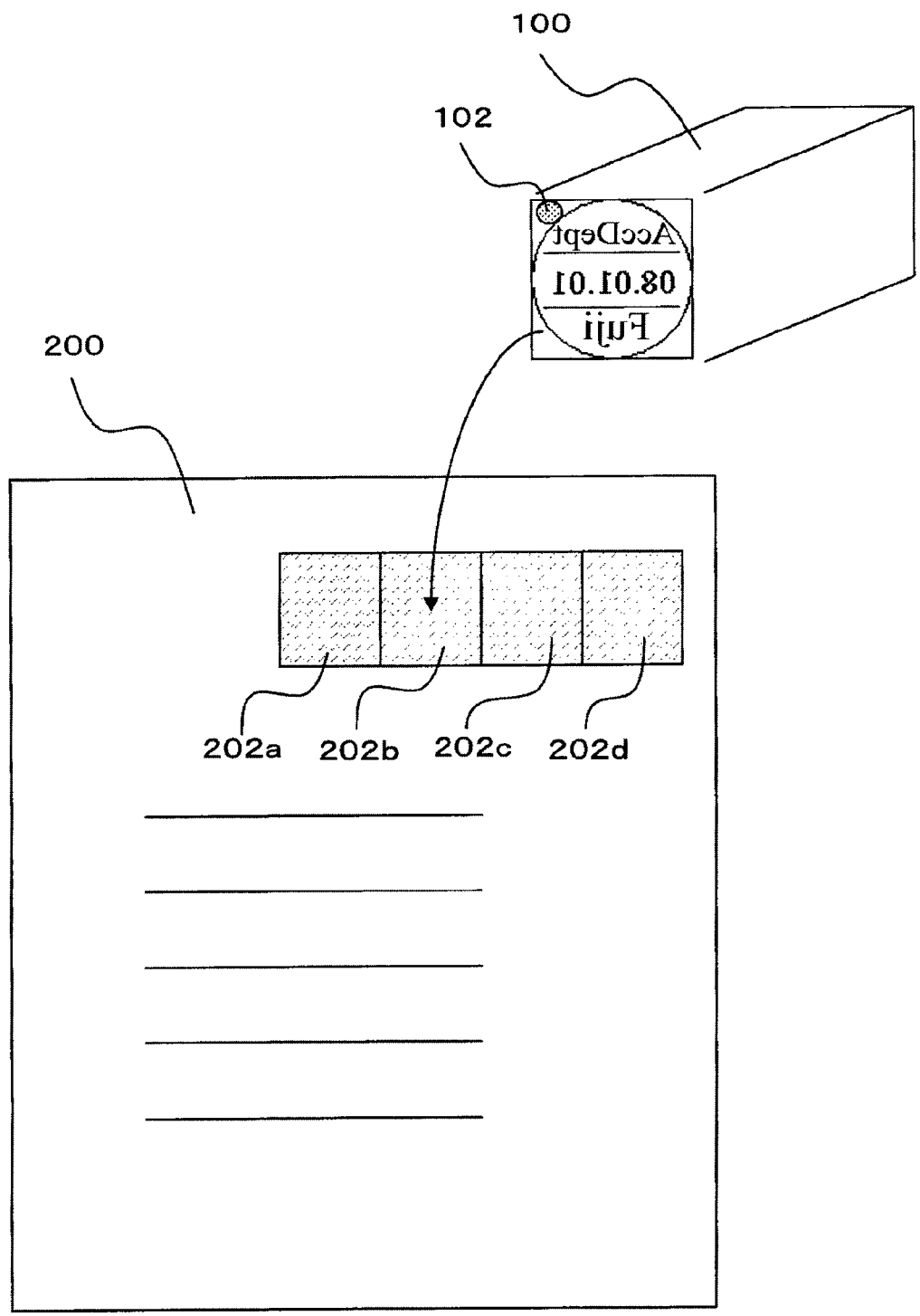
FIG. 1 is a diagram for explaining a mechanism for detecting a progress status of a workflow in an exemplary embodiment of the invention.

As illustrated in FIG. 1, a form 200 (an example of a paper form) used in an exemplary embodiment has stamp fields 202a, 202b, 202c and 202d, on which persons in charge of respective operation stages constituting a workflow (an example of an operation procedure) stamp their seals. In the stamp fields 202a to 202d (which will hereinafter be collectively called an "stamp field 202" when there is no need to make distinctions among the stamp fields 202a to 202d), there are printed minute image codes that represent information for specifying the operation stages associated with the stamp fields 202, respectively. This form is passed among the persons in charge of the respective operation stages during the series of operation stages constituting the single workflow.

A seal 100 of each person in charge is provided with a reading section 102 including a reading device such as a CCD camera. This reading section 102 reads the image code printed on the stamp field 202 on which a seal surface of the seal 100 is stamped. Based on the image code read by the reading section 102, the operation stage associated with the stamp field 202 on which the person in charge has stamped his/her seal is specified. Further, a workflow management device (not shown in FIG. 1) for managing the workflow updates the progress status of the aforementioned operation procedure in accordance with the specified operation stage.

As the image code in the stamp field 202, a well-known two-dimensional or one-dimensional image code, such as a glyph code illustrated in, for example, JP Hei.7-225803 A (corresponding to U.S. Pat. No. 5,449,895), JP 2007-41691 A (corresponding to US 2007/0023523 A), etc., may be used. The system of this exemplary embodiment is not dependent on a type of the image code to be used.

The image code in each stamp field 202 represents, by way of example, unique identification information indicative of the operation stage associated with each stamp field 202. In the general case where progresses of plural workflow instances are managed, the image code in each stamp field 202 may be one indicative of (i) the workflow instance and (ii) the operation stage associated with each stamp field 202 out of the operation stages in the workflow instances.

The workflow instance refers to an individual specific workflow to be executed. For example, in the workflow of internal approval for purchase in a company, a drafter creates an internal approval document for purchase, and then predetermined approvers such as a manager and a general manager will approve this internal approval document in sequence. At the time of purchase of various products, the workflow of internal approval for purchase is executed. The works for internal approval, which are actually carried out for these individual specific products, are individual specific instances belonging to the workflows whose type (class) is "internal approval for purchase".

For example, in the stamp field 202, which is associated with a step (operation stage) having a step ID "001" and is provided in the form 200 for use in a workflow instance to which an instance ID (identifier) "01001" is assigned, there is printed a value obtained by combining an instance ID with a step ID, e.g., an image code indicative of "01001-001". It should be noted that the above-mentioned combination is just one example. The value obtained by combining the instance ID with the step ID is coded into an image code in accordance with a well-known coding algorithm.

Further, according to another example, at each point on the form 200, an image code indicative of a position coordinate of the point on the form 200 may be printed. If the image codes indicative of the position coordinates are used in this manner, when reference is made to information about the positions of the respective stamp fields associated with the respective operation stages, it becomes possible to specify which operation stage the stamp field 200 located in the coordinate indicated by the image code read by the reading section 102. It should be noted that, as such image codes, for example, well-known image codes, such as the image codes proposed by Anoto Group AB and/or the image codes described in JP 2007-41691 A (corresponding to US 2007/0023523 A) may be used. Furthermore, these well-known image codes are each capable of representing not only a positional coordinate of the image code within an image of one page, but also identification information of the page that includes the image code. When the instance ID of the workflow instance is incorporated as page identification information into the image code, the instance ID associated with the form 200 and the operation stage associated with the stamp field 202 to which the seal is stamped can be determined based on the image code, which is read from the form 200 by the reading section 102.

The image codes each has a small area, and the plural image codes are printed so as to be arranged within the stamp field 202. For example, in the case of using image codes each indicative of a value obtained by combining an instance ID with a step ID, the same image codes will be repeatedly arranged within the single stamp field 202. Furthermore, when image codes indicative of position coordinates are used, the respective image codes located within the stamp field 202 will indicate different position coordinates.

The reading section 102 of the seal 100 may have any configuration so long as it can read, from the plural image codes arranged in the stamp field 202, a range based on which a single image code is decoded. In FIG. 1, a read surface of the reading section 102 is located between an outer frame of the seal 100 and the seal surface thereof, but this structure is just one example. The reading section 102 may be located at any position so long as the reading section 102 can read the image code within the stamp field 202 when the seal 100 is stamped on the stamp field 202.

Next, referring to FIG. 2, an example of the overall configuration of a system according to this exemplary embodiment will be described. In this example, a workflow management device 300 manages a flow definition (class definition) of a workflow, progress statuses of individual workflow instances and the like in the manner described below. (1) For example, necessary input is provided to the form 200 of the workflow stored in the workflow management device 300, and then upon printout from a form output device 400 (e.g., a printer), management information about a workflow instance associated with this form is created in the workflow management device 300. (2) A first person A in charge of the workflow, which uses this form 200, receives this form 200. (3) When the person A in charge has stamped his/her seal 100a on the first stamp field 202a on this form 200, a reading section 102a reads an image code within the stamp field 202a. (4) A value obtained by decoding the read image code is transmitted to the workflow management device 300 via a network such as a LAN. In response to this transmission, the workflow management device 300 records the fact that the workflow instance associated with this form 200 has reached the first stage associated with the stamp field 202a (or has completed the first stage).

Figure 2:
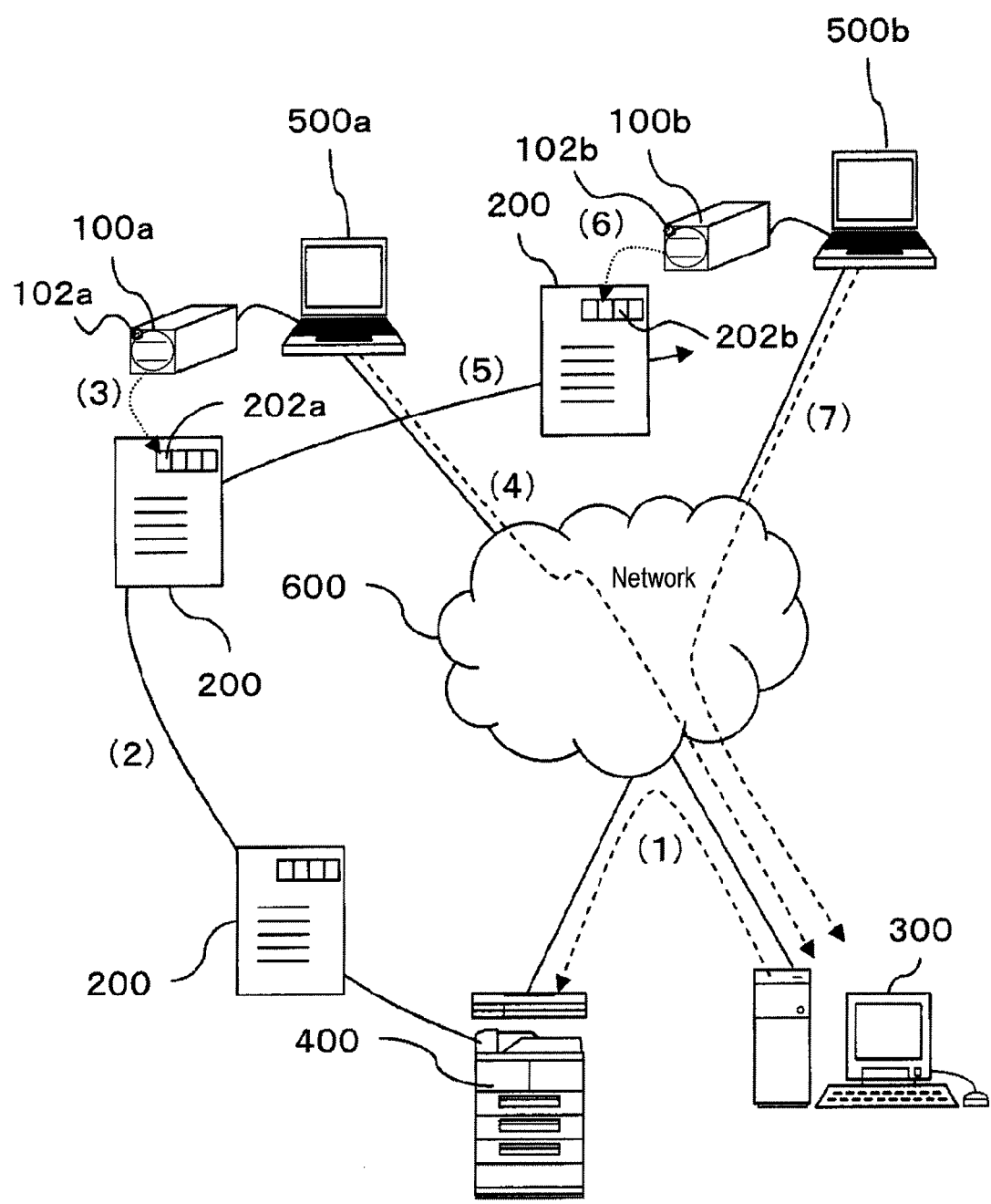
FIG. 2 is a diagram for explaining an example of the overall configuration of a system according to this exemplary embodiment.

In the example illustrated in FIG. 2, the seal 100a is connected to a personal computer (PC) 500a via a wire communication unit such as a USB (Universal Serial Bus: registered trademark), or a wireless communication unit that utilizes Bluetooth (registered trademark), infrared ray, radio wave or the like, and the image code read by the reading section 102 is transmitted to the workflow management device 300 through the PC 500a. In this case, the PC 500a functions as equipment for connection with a network 600. For example, the PC 500a uses a network communication protocol such as TCP/IP to communicate with the workflow management device 300 via the network 600. The equipment for connection between the seal 100a and the network 600 is not limited to the PC 500a. If the seal 100 itself has a function of connecting with the network 600, connection equipment such as the PC 500a is unnecessary.

(5) After the person A in charge stamps the seal, the form 200 is passed to a next person B in charge. (6) The person B in charge confirms the contents of this form 200, and stamps his/her seal 100b on the second stamp field 202b. (7) Then, via a PC 500b and the network 600, the workflow management device 300 is notified of the value of the image code read by a reading section 102b. In response to this notification, the workflow management device 300 records the fact that the workflow instance for this form 200 has reached the second stage associated with the stamp field 202b (or has completed the second stage).

As described above, in this system, when a seal 100 is stamped in a certain stamp field 202 of the form 200, the workflow management device 300 records the fact that the workflow for this form 200 has reached an operation stage (step) associated with the certain stamp field 202.

Figure 3:
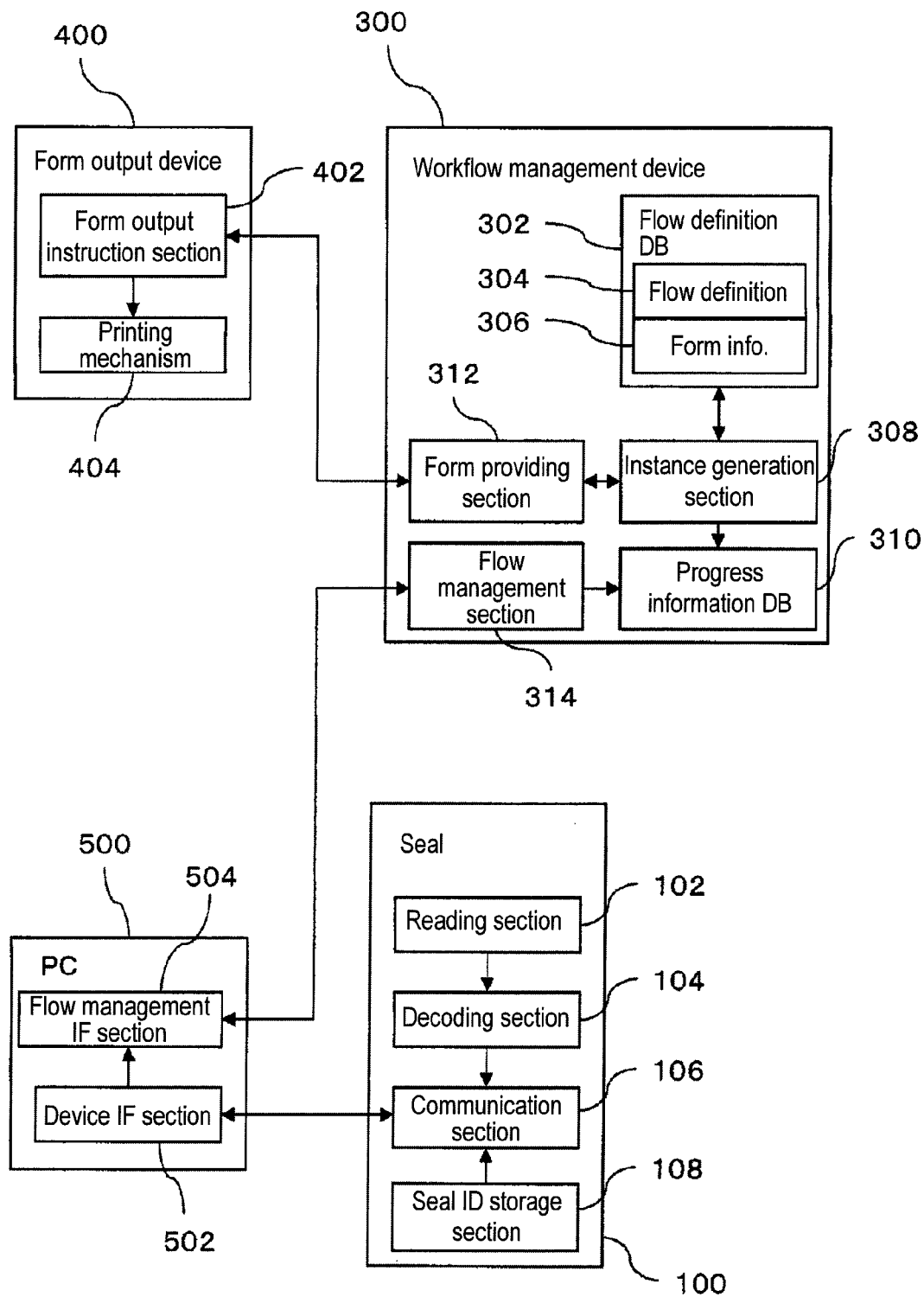
FIG. 3 is a diagram illustrating an example of the internal configurations of respective devices constituting the system according to this exemplary embodiment.

Next, referring to FIG. 3, examples of respective devices constituting the system according to this exemplary embodiment will be further described in detail.

In the example illustrated in FIG. 3, in addition to the reading section 102, the seal 100 further includes a decoding section 104, a communication section 106, and a seal ID storage section 108. The decoding section 104 decodes the image code read by the reading section 102, to thereby obtain a value (e.g., a combination of an instance ID and a step ID) indicated by this image code. The communication section 106 communicates with the PC 500. The seal ID storage section 108 stores identification information (ID) of the seal 100. In one example, the communication section 106 transmits a decode result of the image code, which is read by the reading section 102 when the seal 100 is stamped, to the PC 500 in such a manner that the decode result is associated with the seal ID stored in the seal ID storage section 108.

The PC 500 includes, as programs for the system according to this exemplary embodiment, a device IF (interface) section 502 and a flow management IF section 504. The device IF section 502 communicates with the communication section 106 of the seal 100, and receives information from the seal 100. Further, the device IF section 502 may transmit an instruction and/or data to the seal 100. The flow management IF section 504 communicates with the workflow management device 300 via the network 600. For example, the flow management IF section 504 transmits information that has been received from the seal 100 via the device IF section 502, to the workflow management device 300.

The form output device 400 serves as a device for printing out a form, and includes a form output instruction section 402 and a printing mechanism 404. The form output instruction section 402 serves as a user interface that is used when a user issues an instruction for output of a form. For example, the form output instruction section 402 may be implemented by a web browser. In this case, a web page presenting a workflow type menu is provided from a form providing section 312 of the workflow management device 300 to the form output instruction section 402, and the user selects the desired workflow type from this web page. In response to this user's selection, form information 306 associated with the selected workflow type is supplied from the form providing section 312 of the workflow management device 300. This form information 306 is passed to the printing mechanism 404 via the form output instruction section 402, and is printed onto a sheet of paper.

The workflow management device 300 includes a flow definition DB 302, an instance generation section 308, a progress information DB 310, the form providing section 312, and a flow management section 314. The flow definition DB (database) 302 stores, for each workflow type, a flow definition 304 and the form information 306. The flow definition 304 is data for defining a workflow, and includes, for example, information about processing contents of respective steps (respective operation stages, i.e., respective activities) of a workflow, and/or a condition for a person who should carry out a process.

FIG. 4 illustrates an example of the flow definition 304. In this example, the flow definition 304 includes a flow type ID serving as identification information of a type of a concerned workflow, and a flow type name that is a name of the type. The flow definition 304 further includes identification information (step ID) and name (step name) of respective steps included in the concerned workflow, and a condition (step condition) that should be satisfied by a user who should execute each step. In this example, anyone can execute a step "drafting", but only a person whose job title is "group leader" can execute a step "first approval".

The form information 306 is information for specifying a form to be used in the concerned workflow. The form information 306 includes, for example, information about positions and/or shapes of respective fields such as the stamp field 202 included in the form 200, information about contents and/or a position of a fixed phrase and/or a graphic displayed within the form 200, etc. The form information 306 may be described in a PDF (Portable Document File) or in a page description language, for example.

The instance generation section 308 generates a workflow instance in accordance with the flow definition 304. For example, when a user accesses the workflow management device 300 from the PC 500 and selects a type of a workflow to issue an instruction for instance generation, the instance generation section 308 generates a workflow instance in accordance with the flow definition 304 of the selected workflow type.

Figure 5:
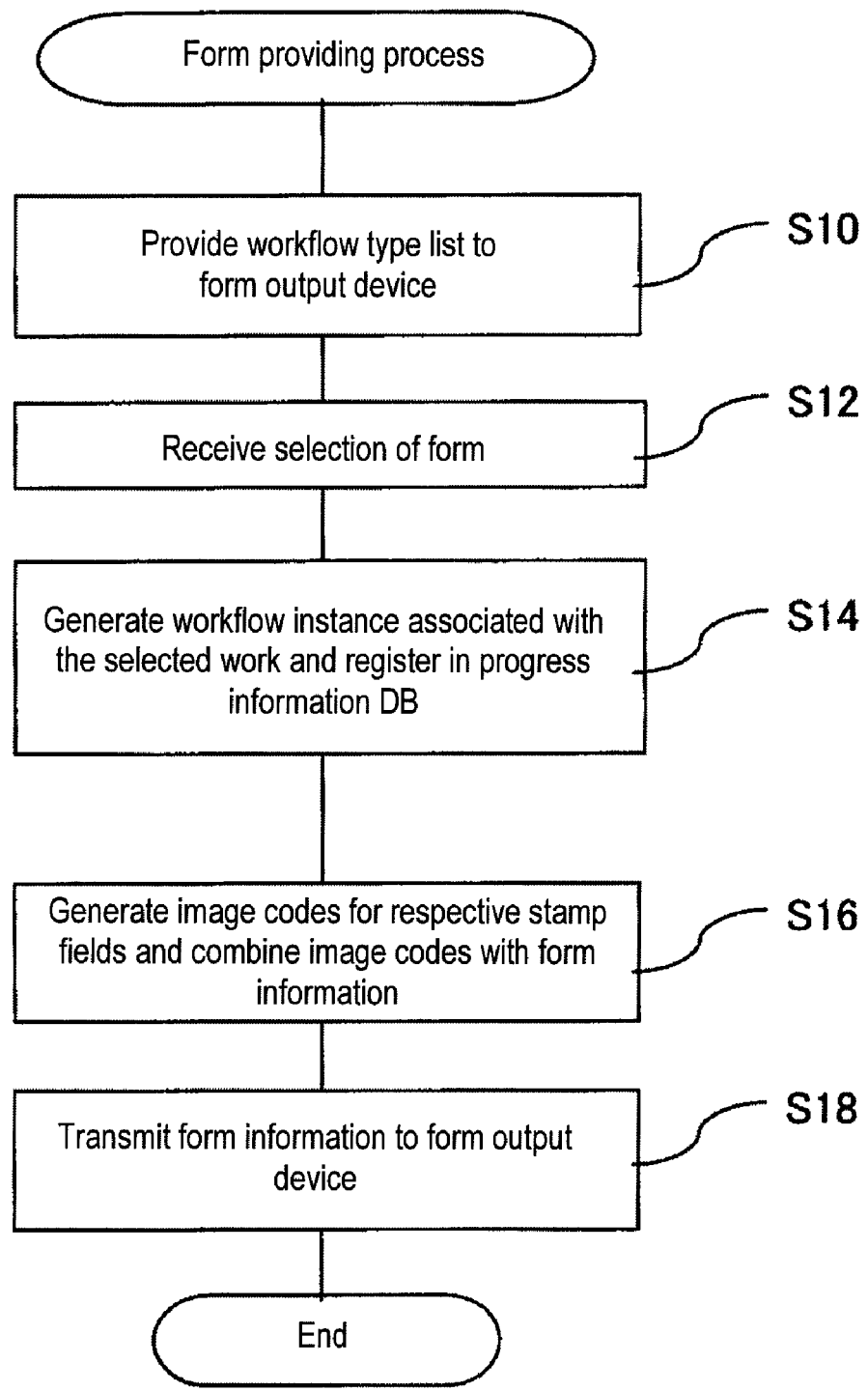
FIG. 5 is a flow chart illustrating an example of a procedure of a form providing process.

Furthermore, the instance generation section 308 generates an instance and provides form information in response to a form output instruction issued from the form output device 400. An example of procedure of this process will be described with reference to FIG. 5.

In this procedure, first, upon request for a workflow type list from the form output instruction section 402 of the form output device 400, the form providing section 312 provides this list, for example, as a web page (S10). When a user who operates the form output device 400 selects a type of a workflow that the user desires to execute, from the list displayed by the form output instruction section 402, and issues an instruction for output of a form, this instruction is transmitted to the instance generation section 308 via the form providing section 312 (S12). The instance generation section 308 registers a workflow instance in the progress information DB 310 in accordance with the flow definition 304 of the selected workflow type (S14). At this time, the instance generation section 308 assigns a unique instance ID to this workflow instance. If the instance ID is a value, for example, including a flow type ID, it is determined from the instance ID which flow type the instance belongs to. Alternatively, the association relation between the generated instance ID and the flow type ID may be stored.

Furthermore, the instance generation section 308 generates image codes that should be displayed in the respective stamp fields 202 of the form 200, which is indicated by the form information 306 associated with the selected type, and arranges these image codes within the associated stamp fields 202 so that the image codes are combined therewith (S16). In this case, according to one example, the image code of each stamp field 202 may be generated by coding a combination of the instance ID assigned to the instance and the step ID associated with each stamp field 202. The instance generation section 308 transmits the form information 306, in which the image codes are combined with the respective stamp fields 202, to the form output instruction section 402 via the form providing section 312 (S18). This form information 306 is printed out from the printing mechanism 404, thus outputting, as a paper document, the form 200, which is associated with the workflow instance registered in the progress information DB 310.

Figure 6:
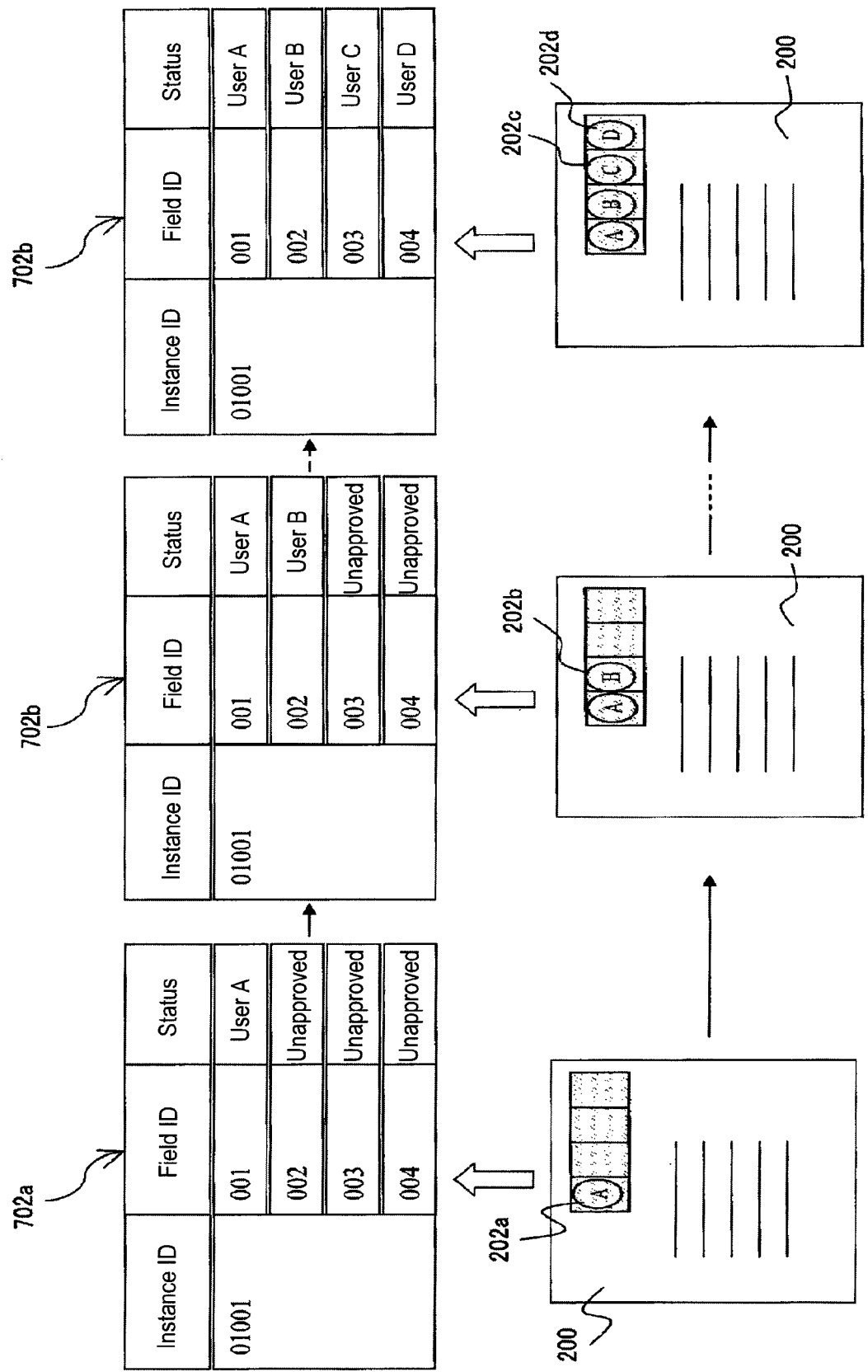
FIG. 6 is a diagram illustrating how progress information is updated in response to stamp.

The progress information DB 310 serves as a database for managing information indicative of a progress status of each workflow instance (which will be called "progress information"). For example, as illustrated in FIG. 6, progress information 702a of one workflow instance is identified by an instance ID of that instance. In the progress information 702a, for a field ID (which is equivalent to the step ID) of each stamp field 202 on the form 200, there is stored a state of each stamp field 202 (associated with the step). In this example, identification information (user ID) of a user who has stamped his/her seal on each stamp field 202 is registered in a state field. If no one has stamped his/her seal, a value of the state field is "unapproved".

The flow management section 314 receives, from the flow management IF section 504 of the PC 500, information of the image code read by the reading section 102 of the seal 100, and updates, in accordance with this information, the progress information stored in the progress information DB 310.

For example, in the example illustrated in FIG. 6, when a user A who has received the form 200 stamps the seal 100 in the first stamp field 202a, the reading section 102 of the seal 100 reads an image code from the stamp field 202a, and the decoding section 104 decodes this image code. Thus, the instance ID for this form 200 and the field ID (step ID) of this stamp field 202a are obtained. These pieces of information are sent to the PC 500 by the communication section 106 together with the seal ID read from the seal ID storage section 108. The PC 500 transmits these pieces of information to the flow management section 314 of the workflow management device 300.

The flow management section 314 specifies a user ID associated with the seal ID included in the received information. For this purpose, information about the association relation between the seal ID and the user ID is registered in advance in the workflow management device 300. If the user ID is used as the seal ID of the seal owned by the user, it is not necessary to convert the seal ID into the user ID. Further, the flow management section 314 searches the progress information DB 310 for the progress information associated with the instance ID included in the received information, and writes the specified user ID into the state field of this progress information, which is associated with the field ID included in the received information. Thus, the progress status of the workflow instance, which uses the form 200, becomes one represented by the progress information 702a.

In addition to the process of updating the progress information as described above, the flow management section 314 may perform a process specified by flow definition (e.g., a process of notifying to a person in charge of the next step).

When a user B stamps the seal 100 in the second stamp field 202b of the form 200 after the user A stamps, the progress information of the instance is changed to progress information 702b by the similar process. Similarly, when a user C and a user D stamp the seals 100 in the third and fourth stamp fields 202c and 202d, respectively, the progress information of the instance is changed to progress information 702c. As a result, the issue presented by the form 200 having the instance ID "01001" is settled.

FIG. 6 illustrates the example in which all of the steps (operation stages) in the workflow instance are performed only with the paper form 200. However, the system according to this exemplary embodiment is also applicable to the case where a step(s) executed on a paper and a step(s) executed on electric data are mixed.

Figure 7:
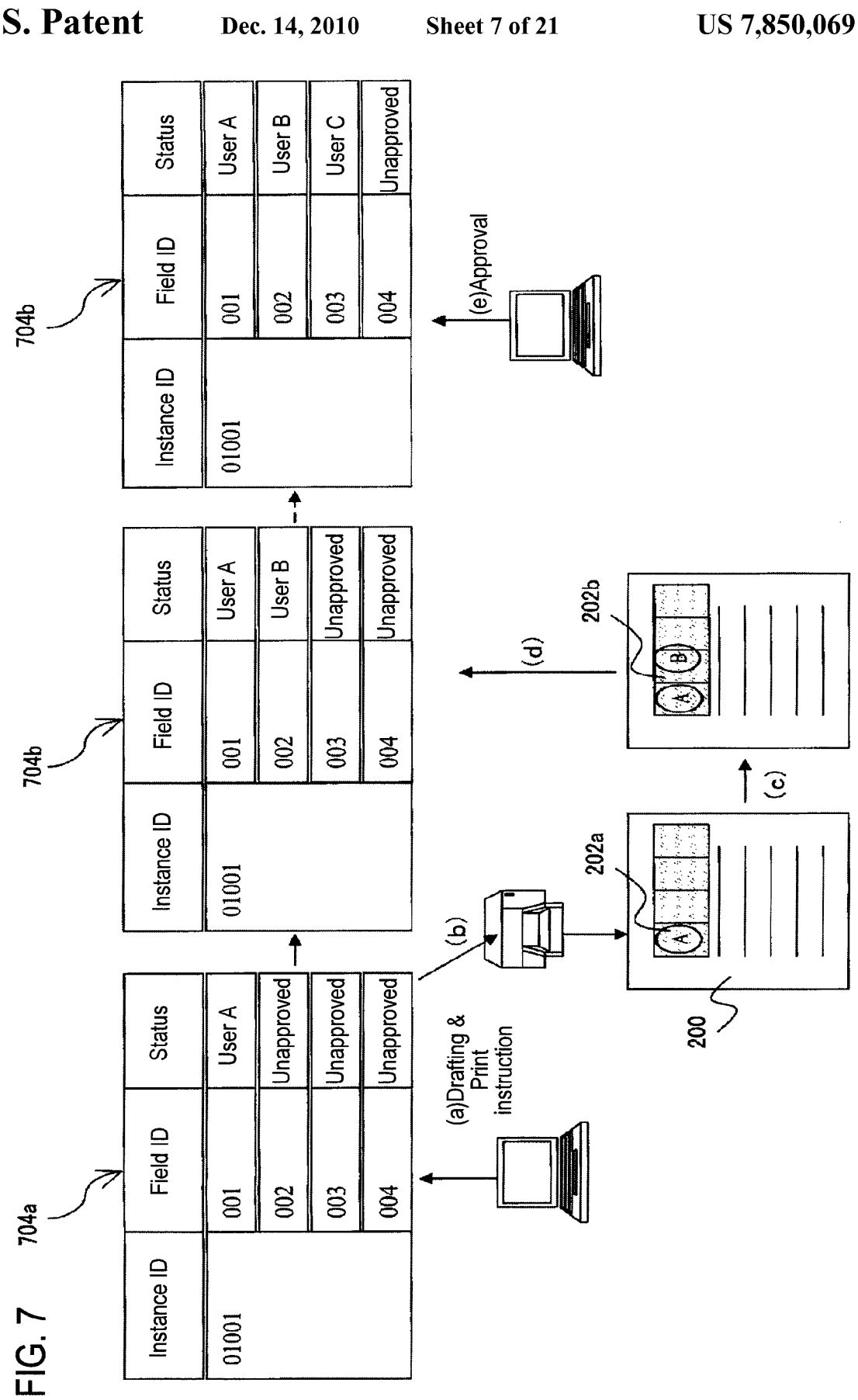
FIG. 7 is a diagram illustrating how a workflow progresses in the case where a step executed on a paper and a step executed on electronic data are mixed.

For example, in an example illustrated in FIG. 7, the following steps are performed. (a) When a user A accesses the workflow management device 300 from his/her PC 500, selects a type of a workflow to be executed, and issues an instruction for instance generation, progress information of this instance is registered in the progress information DB 310, and the form information 306 associated with this workflow type is provided to the PC 500. When the user A makes an entry into this form information 306 and performs an approval operation, this progress information becomes one represented by progress information 704a. The user A issues an instruction for printing of a form after an approval operation. Then, (b) this form 200 is printed out from a printer. In the first stamp field 202a of the printed form 200, an image of seal impression of the user A is printed. (c) This paper form 200 is passed to a user B. The user B stamps his/her seal 100 in the second stamp field 202b of this form 200. Then, (d) a decode result of the image code read from the stamp field 202b by the reading section 102 is sent to the workflow management device 300. As a result, the status of the instance becomes one represented by progress information 704b. Next, (e) when a user C accesses the workflow management device 300 from his/her PC 500 and opens the form of the instance to perform an approval operation, the status of the instance becomes one represented by progress information 704c.

It is noted that the contents of the form 200 are not always approved, but might be rejected by a person in charge of any of the steps. The person in charge who rejects the contents of the form 200 stamps a rejection seal in the stamp field 202 of his/her step, for example. Similarly to the seal 100 serving as a normal approval seal, the rejection seal contains the reading section 102, the decoding section 104, the communication section 106 and the seal ID storage section 108. For example, if the seal ID of the rejection seal is defined as a value indicative of the rejection, the workflow management device 300 can know from the seal ID sent from the rejection seal via PC 500 that the rejection seal has been stamped. For example, a special value indicative of the rejection (which is reserved so as not to be used for the user ID) is registered in association with the seal ID ("XXXXX" in FIG. 8) of the rejection seal into the information about the association relation between the seal ID and a user ID, which is stored in the workflow management device 300. When it is detected that the rejection seal is stamped in one of the stamp fields 202 of the form 200, the workflow management device 300 changes to "rejected" a value of a state field of a step, associated with this stamp field 202, in the progress information of the form 200.

In the example illustrated in FIG. 8, only one seal ID of the rejection seal is provided; alternatively, a user ID, an ID of the approval seal, and an ID of the rejection seal may be registered for each user.

Figure 9:
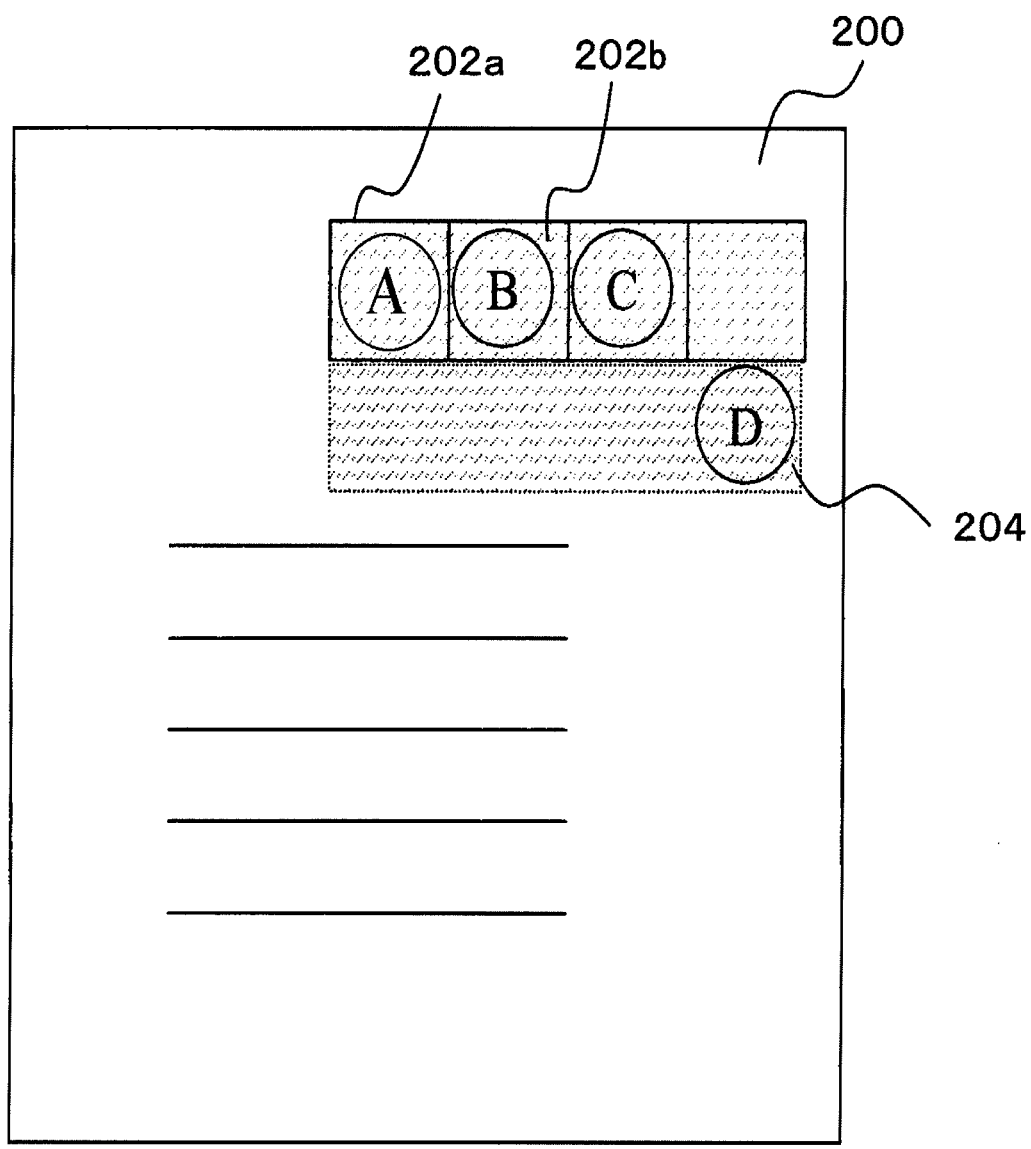
FIG. 9 is a diagram schematically illustrating an example of a form including a rejection field.

Further, as illustrated in FIG. 9, instead of preparing the rejection seal, the form 200 may be provided with a rejection stamp field 204 in addition to the approval stamp fields 202a, 202b, . . . , and a user may stamp the normal approval seal in the rejection stamp field 204, thus indicating the intention of rejection. In this case, the workflow management device 300 may recognize that the field ID (step ID) of the stamp field 204 indicates the rejection. Furthermore, in this case, it is possible to identify, from the seal ID, who has rejected the contents of the form 200.

Figure 10:
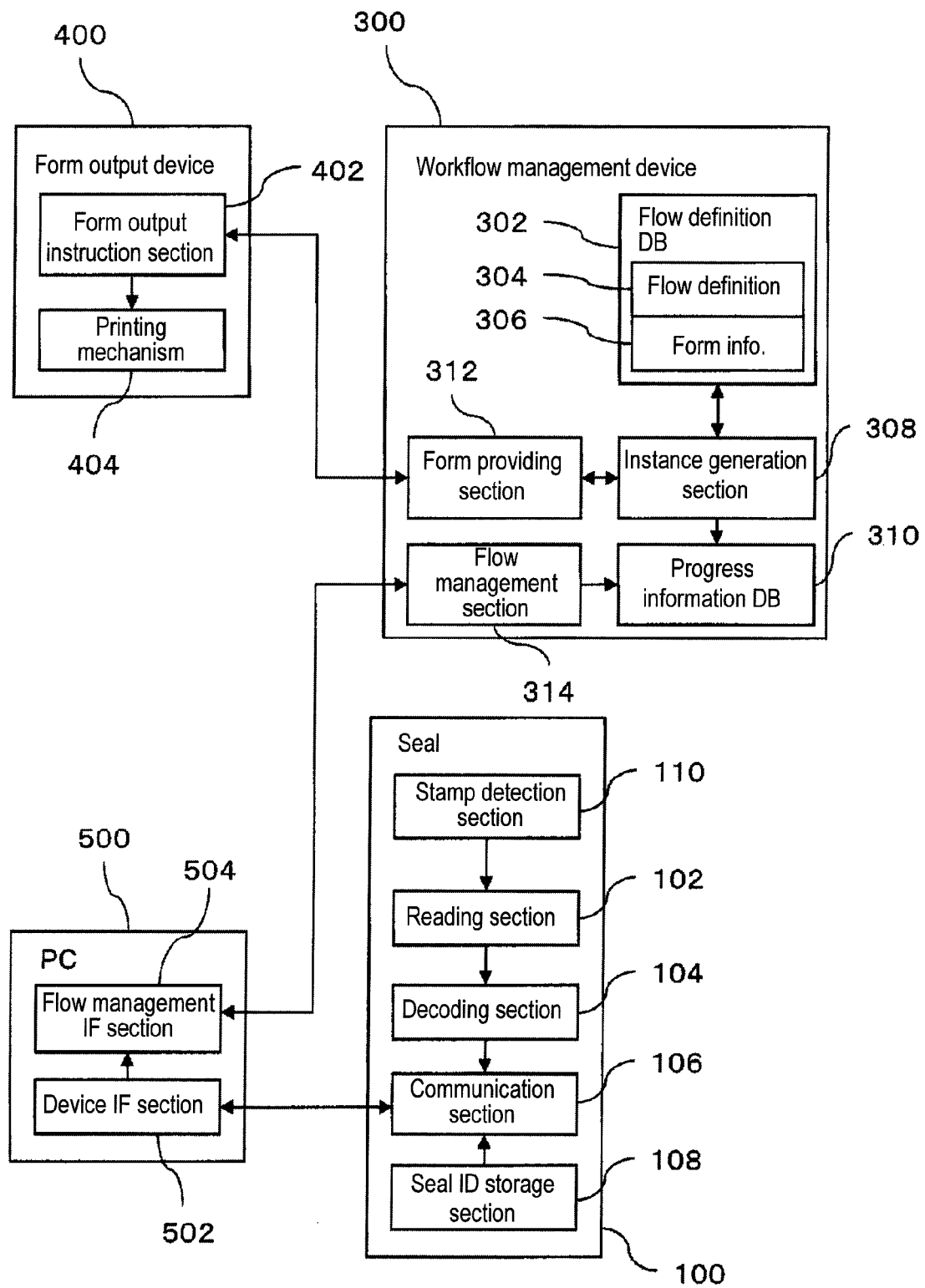
FIG. 10 is a diagram illustrating a system configuration example according to a first modification example.

A first modification example of the above exemplary embodiment will be described with reference to FIG. 10. In this modification example, the seal 100 includes a stamp detection section 110. The stamp detection section 110 detects if the seal surface of the seal 100 is stamped on the form 200. For example, various types of well-known devices, such as a pressure-sensitive sensor for detecting a pressure acting on the seal surface and a distance sensor for detecting a distance between the seal surface and a paper surface of a form 200, may each be utilized as the stamp detection section 110. If the stamp detection section 110 detects stamping, the reading section 102 reads an image code from the stamp field 202. In this modification example, the image code of the stamp field 202, in which the seal 100 is stamped, is read. Further, the reading section 102 may periodically carry out this reading operation, and when the decoding section 104 decodes a read result, it may be determined that the seal 100 is stamped.

Next, a second modification example of the above exemplary embodiment will be described with reference to FIG. 11. In this modification example, the seal 100 is provided with a stamp restriction section 112. The seal surface of the seal 100 in this example is protected by a casing that surrounds the periphery of the seal surface. This casing protrudes beyond the seal surface toward a direction in which the seal is stamped. Therefore, in a state where the seal is not pressed against a sheet of paper, the paper cannot be in contact with the seal surface even if the paper may be brought into contact with the casing. When the seal 100 is pressed against the paper, the seal surface and the casing relatively move (i.e., the seal surface is lowered or the casing is raised), thereby pressing the seal surface against the sheet of paper to complete stamping. The stamp restriction section 112 serves as a mechanism for restricting the relative movement between the seal surface and the casing in this seal 100. When an image code read from the stamp field 202 by the reading section 102 is decoded, the decoding section 104 sends a restriction release signal to the stamp restriction section 112. Upon reception of the restriction release signal, the stamp restriction section 112 releases the restriction, thereby allowing the relative movement between the seal surface and the case in response to a pressing operation. Thus, the seal surface is stamped in the stamp field 202. On the other hand, while the decoding section 104 does not yet decode the image code, the stamp restriction section 112 restricts the relative movement between the seal surface and the casing. Therefore, the stamping cannot be completed even if the seal 100 is pressed against the form 200. In this modification example, a situation where only the stamping is completed while the image code is not read yet is unlikely to occur.

Next, a third modification example of the above exemplary embodiment will be described with reference to FIGS. 12 to 14. In this modification example, image codes indicative of position coordinates are printed all over a form 250. When the image codes are decoded, the coordinates of positions at which these image codes are printed are obtained. As such image codes, image codes, such as those proposed by Anoto Group AB and/or those described in JP 2007-41691 A (corresponding to US 2007/0023523 A), may be used. In addition to the position coordinates, the image codes may include information of an instance ID for identifying this form 250.

Information of respective stamp fields f12, f13, f14 and f15 on this form 250 are registered as a part of the form information 306 (see FIG. 3) in the workflow management device 300. FIG. 13 illustrates exemplary information of the stamp fields. In this example, this information also includes information of a field (e.g., the entire form) other than the stamp fields. This information will be referred to as "field information". In this example, a name and position information are registered for each field in association with the field ID for uniquely identifying each field. Each field is provided as a rectangular region, and the position information of each field is represented as a set of an upper left corner coordinate and a lower right corner coordinate of this field. As for each stamp field, the field ID is associated with the step ID of the step associated with each stamp field.

Figure 14:
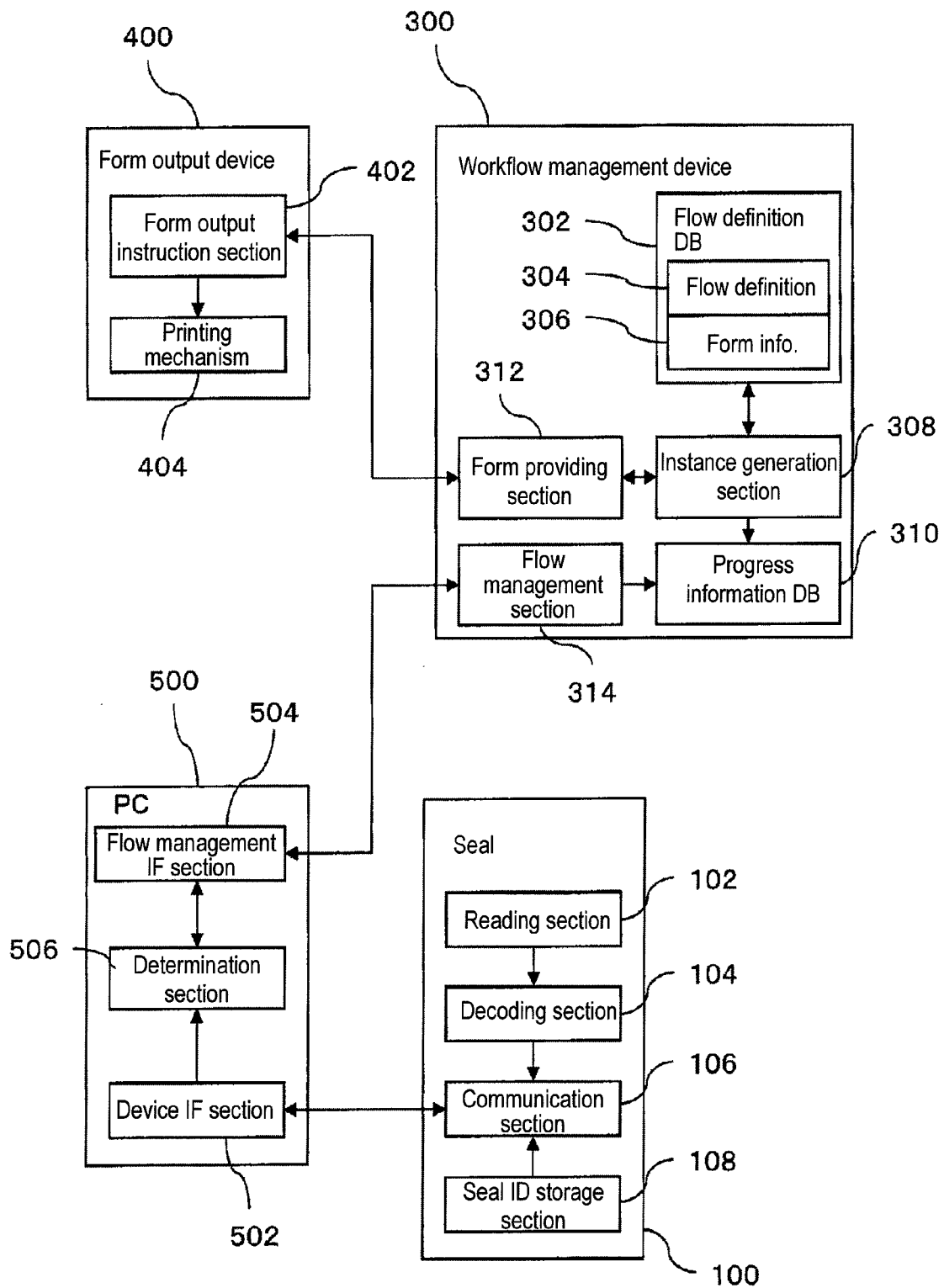
FIG. 14 is a diagram illustrating a system configuration example according to the third modification example.

In a system according to this modification example, as illustrated in FIG. 14, the PC 500 includes a determination section 506. A decode result, obtained by the decoding section 104 from the image code read by the reading section 102 of the seal 100, includes the position coordinate of this image code. The determination section 506 makes reference to the field information (see FIG. 13), to determine which filed includes this position coordinate. For example, if the reading section 102 reads the image code within the stamp field f12, the determination section 506 knows that this image code is included in the stamp field f12 and obtains a field ID "f12" of this field. The obtained field ID is transmitted to the workflow management device 300 via the flow management IF section 504. Based on this field ID, the workflow management device 300 identifies which stamp field of the form 250 the seal 100 is stamped in. The form (instance) may be identified based on the instance ID decoded from the image code.

In the example illustrated in FIG. 14, the determination section 506 is provided in the PC 500, but this configuration is just one example. The determination section 506 may be provided in the workflow management device 300 or may be provided in the seal 100.

Figure 15:
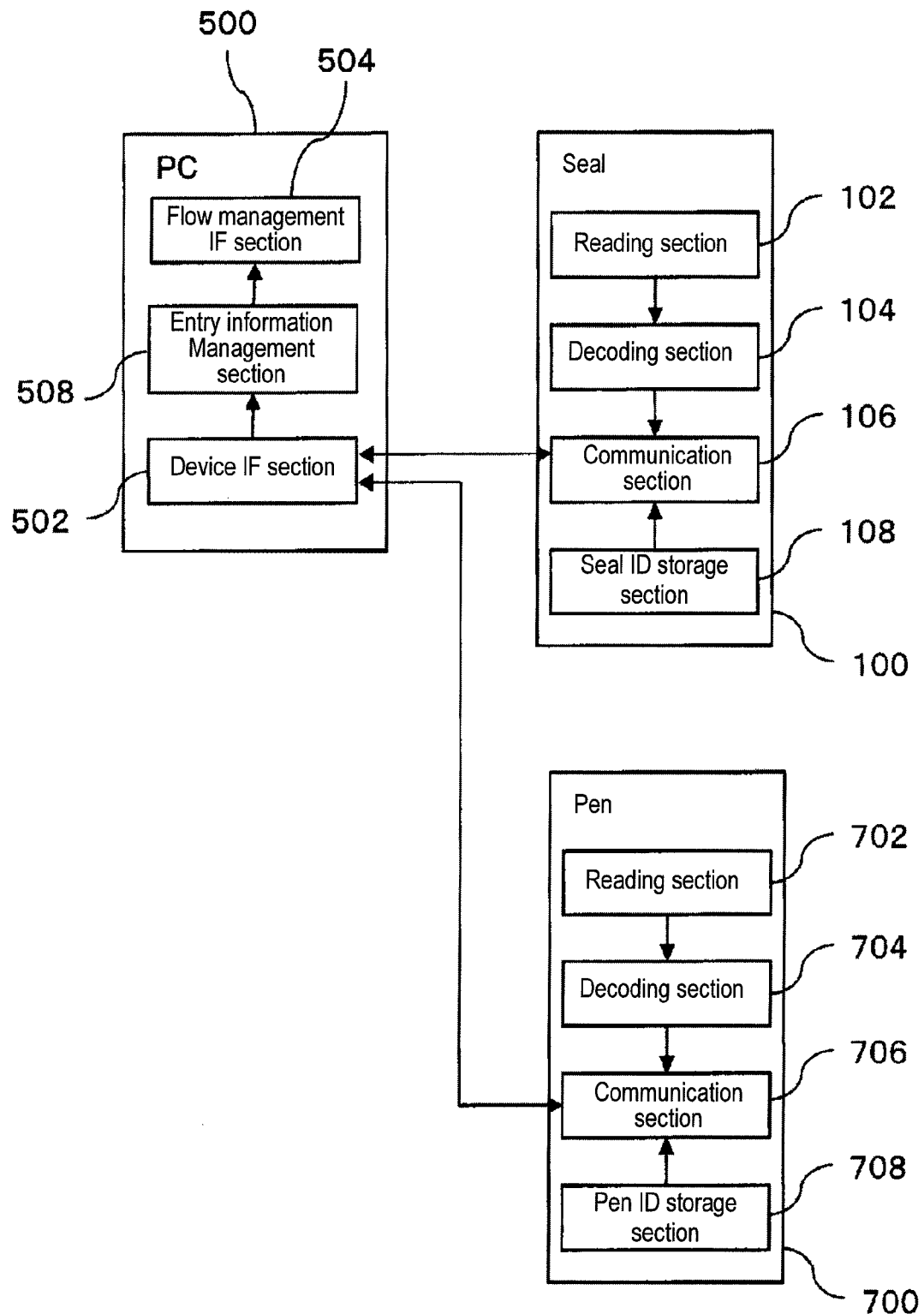
FIG. 15 is a diagram illustrating a system configuration example according to a fourth modification example.

Next, a fourth modification example of the above exemplary embodiment will be described with reference to FIG. 15. In FIG. 15, the workflow management device 300 and the form output device 400 are not shown.

A system according to this modification example includes a pen 700 that includes a reading section 702 for reading an image code. With a writing operation performed using the pen 700, a trajectory of a pen point is read by the reading section 702. More specifically, in this modification example, in addition to detecting the progress of a step based on an image of the seal 100, contents entered by the pen 700 are captured, and registered in the workflow management device 300.

In a form for use in this modification example, an image code indicative of at least a positive coordinate is printed in an entry field that is set as an object to which an entry is made by the pen. An image code indicative of a position coordinate may also similarly be printed in each stamp field. In this case, the stamp field may be identified in a similar manner to the third modification example. Further, in an alternative example, an image code indicative of a combination of an instance ID and a step ID may be printed in each stamp field.

The reading section 702 of the pen 700 is disposed so as to be adjacent to the pen point and to read a range having a predetermined positional relation with the pen point. As such a pen, a pen such as one provided by Anoto Group AB may be used. A decoding section 704 decodes the image code read by the reading section 702. A communication section 706 associates decode result values (positional coordinates) with identification information (pen ID) of the pen 700 stored in a pen ID storage section 708, and transmits the values associated therewith to the device IF section 502 of the PC 500. The communication section 706 may transmit the decoded coordinates one by one or may transmit the decoded coordinates collectively for each trait (for each stroke). In the latter case (where the decoded coordinates are transmitted collectively for each trait), the communication section 706 starts storing the position coordinates of decode results since normal decode results are started to be obtained from the decode section 704; then, the communication section 706 transmits, as stroke information for one trait, a sequence of the position coordinates, which are stored until no decode result is obtained, to the PC 500. An entry information management section 508 of the PC 500 stores data of the sequence of position coordinates sent from the pen 700. After the entry made by the pen, when a user stamps the seal 100 in a stamp field, information of the image code read from the stamp field by the reading section 102 of the seal 100 is transmitted to the PC 500. The entry information management section 508 associates the information of the sequence of coordinates, which are entered by the pen (i.e., a group of pieces of stroke information for each stroke) and are stored by that time, with information of the stamp field (such as a combination of the instance ID and step ID), and transmits the information associated therewith to the workflow management device 300. The workflow management device 300 registers the received information of the series of entry coordinates as information indicative of contents that is additionally written into the form during the step associated with the stamp field, into the progress information DB 310 in association with the step of the instance. Thus, the additional contents added to the form can be managed by the workflow management device 300.

In the above-described example, coordinate information sent from the pen 700 is temporarily stored in the entry information management section 508, and is then transmitted to the workflow management device 300, but the invention is not limited thereto. The coordinate information sent from the pen 700 may be directly sent to the workflow management device 300 without being stored in the PC 500.

Further, in the above-described example, the trajectory of an entry made by the pen 700 by stamping of a seal is registered as additionally-written information of the step associated with the stamp field in which the seal is stamped, but this is just one example. So long as the stamping and the entry made by the pen can be associated with each other, the temporal relationship therebetween may be any temporal relationship. For example, information that is additionally written within a time period being determined in advance with respect to the stamping time may be registered as additionally-written information of the step associated with the stamp field in which the seal is stamped.

Next, a fifth modification example of the above exemplary embodiment will be described with reference to FIGS. 16 to 18.

Figure 16:
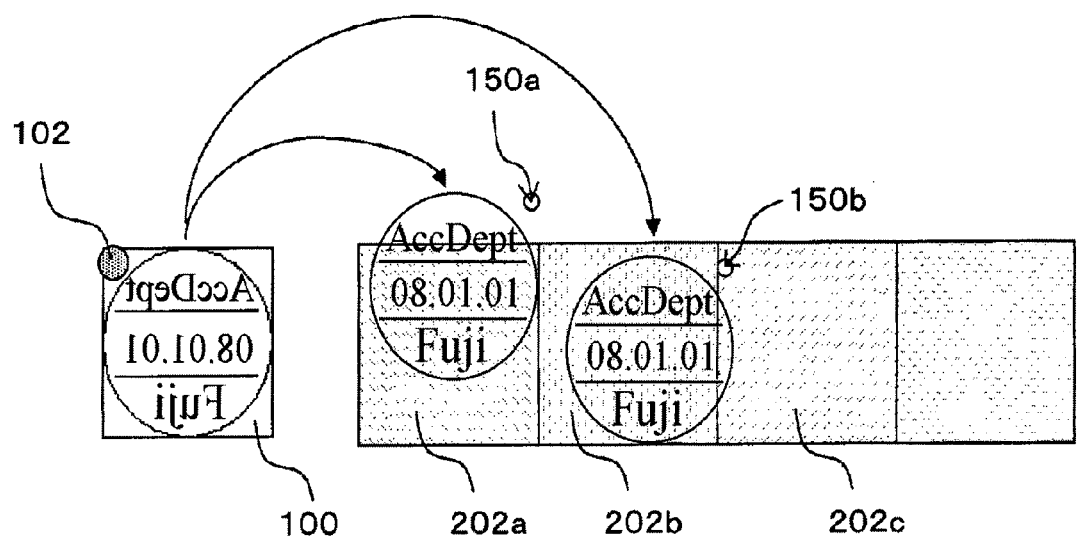
FIG. 16 is a diagram for explaining an exemplary trouble that occurs when a seal has a single reading section.

As illustrated in FIG. 16, if only one reading section 102 is provided in the seal 100, the reading section 102 might read an outside of the stamp field 202 when the seal 100 is stamped so that the seal surface thereof partially protrudes from the stamp field 202. For example, in the example of FIG. 16, if the seal 100 is stamped in the stamp field 202*a* in the illustrated manner, a reading range 150*a* of the reading section 102 is located in a region that is outside the stamp field 202*a* and in which no image code exists. Further, if the seal 100 is stamped in the stamp field 202*b* in the illustrated manner, a reading range 150*b* of the reading section 102 does not cover the image code of the stamp field 202*a* on which the seal 100 is stamped, but covers the image code of the adjoining stamp field 202*c*. In either case, a stamp target cannot be properly specified.

Figure 17:
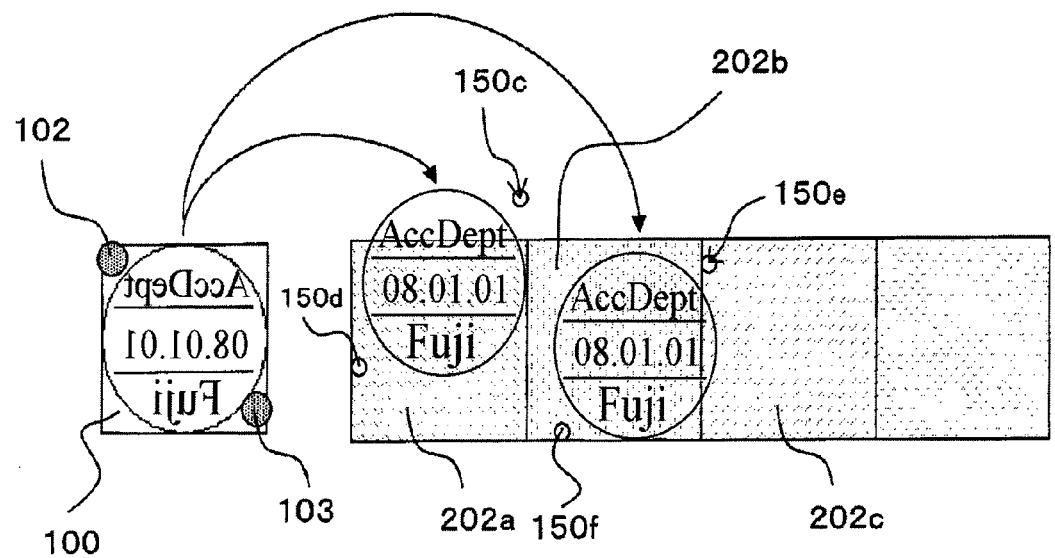
FIG. 17 is a diagram illustrating an example of a seal according to a fifth modification example.

Therefore, in the fifth modification example, two reading sections 102 and 103 are provided in the seal 100 as illustrated in FIG. 17. In this modification example, by way of example, the two reading sections 102 and 103 are disposed so as to read diagonal positions with the seal surface interposed therebetween. When this seal 100 is stamped, even if the seal 100 is stamped in the stamp field 202*a*, for example, in the manner similar to that illustrated in FIG. 16, a reading range 150*d* of the reading section 103 is located within the stamp field 202*a* although a reading range 150*c* of the reading section 102 is located outside the stamp field 202*a*. Further, if the seal 100 is stamped in the stamp field 202*b* in the manner illustrated in FIG. 17, a reading range 150*e* of the reading section 102 reads an image code of the stamp field 202*c* that is located outside of the stamp field 202*b*, but a reading range 150*f* of the reading section 103 is located within the stamp field 202*b*. Accordingly, the possibility of detecting information of the proper stamp target is increased.

Figure 18:
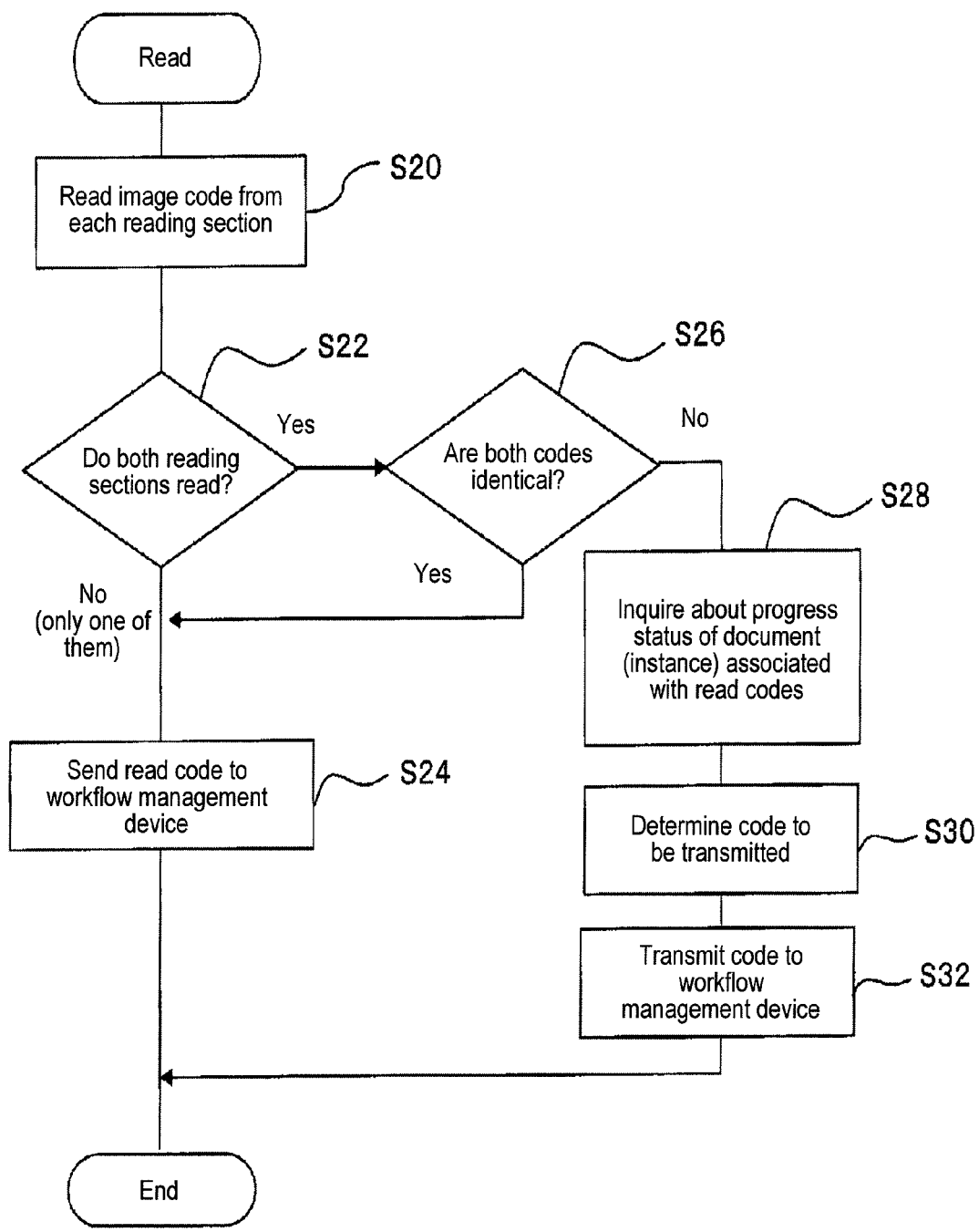
FIG. 18 is a flow chart illustrating an example of a processing procedure according to the fifth modification example.
Figure 19:
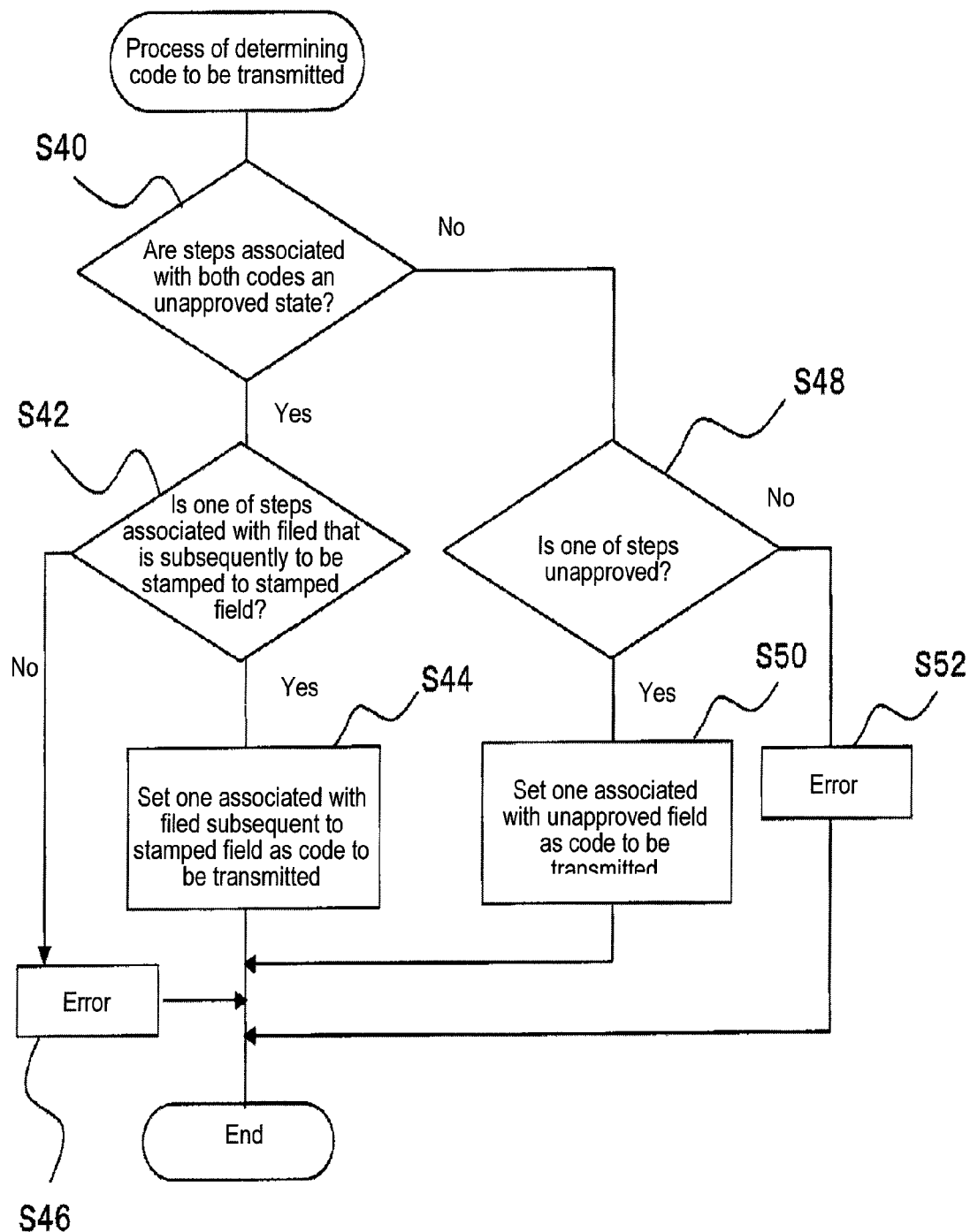
FIG. 19 is a flow chart illustrating exemplary details of the processing procedure according to the fifth modification example.

In this modification example, for example, the PC 500 receives information of read results of the respective reading sections 102 and 103, and performs process steps illustrated, for example, in FIGS. 18 and 19, to thereby specify the stamp target.

Specifically, first, the PC 500 receives, from the seal 100, decoded values of read results of the respective reading sections 102 and 103 (S20). Next, it is determined as to whether the decoded values are obtained from both of the reading sections 102 and 103 (S22). If the decoded value of only one of the reading sections 102 and 103 is obtained, it is considered that the other reading section reads a blank region. In this case, the obtained decoded value is transmitted to the workflow management device 300 (S24). It should be noted that if no decoded value is obtained from both of the reading sections 102 and 103, the process of FIG. 18 is not started in the first place.

If it is determined in Step S22 that the decoded values are obtained from both of the reading sections 102 and 103, the PC 500 compares these decoded values (S26). Then, if both the values are identical, this identical value is transmitted to the workflow management device 300 (S24).

If both the values are different, it is considered that the same situation as illustrated in FIG. 17 in which the seal 100 is stamped in the stamp field 202*b* occurs. In this case, the PC 500 makes reference to the progress status of a workflow instance associated with the form, to thereby determine which of the decoded values is correct. Specifically, in this case, the PC 500 transmits an instance ID value common to both the decoded values to the workflow management device 300, and makes a request for the progress information of this instance ID (S28). Then, based on the progress information received from the workflow management device 300 in response to this request, the correct decoded value is determined out of both the decoded values (S30). The decoded value, which is determined as being correct, is transmitted to the workflow management device 300 (S32).

FIG. 19 illustrates an example of detailed procedure of Step S30. In this procedure, reference is made to the progress information acquired in Step S28, to thereby determine as to whether both of respective steps (operation stages) indicated by both the decoded values are unapproved (S40). If both of the steps are unapproved, it is then determined as to whether one of them is indicative of a stamp field subsequent to the stamp field associated with the latest approved step in the progress information (S42). If this determination result is affirmative (Yes), out of the two decoded values, the decoded value associated with the stamp field subsequent to the stamp field, which is associated with the latest approved step, is determined as being indicative of the proper stamp target (S44). On the other hand, if the determination result obtained in Step S42 is negative, error processing is performed assuming that the seal is stamped on a wrong stamp field (S46).

If the determination result obtained in Step S40 is negative (No), both of the two decoded values are indicative of the approved stamp field, or one of the decoded values is indicative of the approved stamp field while the other decoded value is indicative of the unapproved stamp field. Therefore, the PC 500 determines as to whether this is either the former or the latter (S48). If one of the decoded values is indicative of the unapproved stamp field while the other decoded value is indicative of the approved stamp field, the decoded value associated with the unapproved stamp field is determined as being indicative of the proper stamp target (S50). On the other hand, if both of the decoded values are indicative of the approved stamp field, error processing is performed assuming that the seal is stamped in a wrong stamp field (S52).

It should be noted that the seal 100 may be provided with three or more reading sections.

Next, a sixth modification example of the above exemplary embodiment will be described with reference to FIGS. 20A, 20B and 21. In this modification example, it is assumed that a date seal is provided as the seal 100 (see FIG. 20A). The seal 100 of this type includes plural dials 120 located in the seal surface and used for adjustment of values of year, month and day. In this modification example, the seal 100 is provided with a date reading section 114 for reading numerals at specific positions of the dials 120 (see FIG. 20B). Since numerals located at the seal surface have a certain relationship with respect to the numerals read by the date reading section 114, the numerals located at the seal surface can be determined based on this relationship. The date reading section 114 is not limited to one that optically reads numerals, but may be one that reads rotational positions of dials by an encoder.

Figure 21:
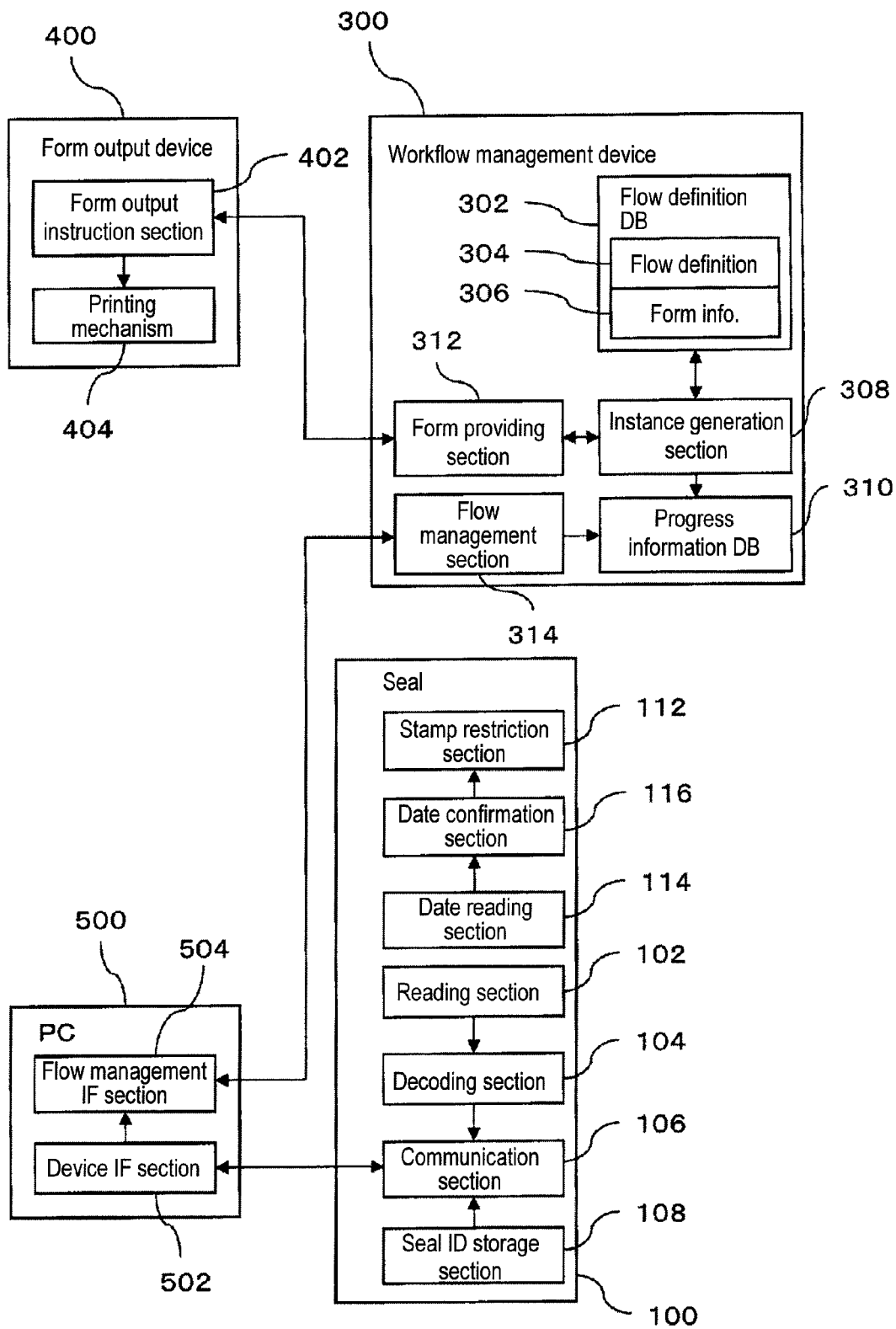
FIG. 21 is a diagram illustrating a system configuration example according to the sixth modification example.

As illustrated in FIG. 21, in addition to the date reading section 114, the seal 100 includes a date confirmation section 116 and the stamp restriction section 112. The other components of the system illustrated in FIG. 21 may be similar to those of the system illustrated in FIG. 3.

The stamp restriction section 112 restricts the relative movement between the seal surface and the casing similarly to that illustrated in FIG. 11, to thereby restrict the seal 100 from being stamped.

The date confirmation section 116 compares the current date and the date of the seal surface determined from the numerals read by the date reading section 114, to thereby determine as to whether the date of the seal surface is correct. The current date may be obtained from a clock embedded in the seal 100 or may be acquired by carrying out communication from an external device such as the PC 500. If the date of the seal surface coincides with the current date, the date confirmation section 116 releases the restriction put by the stamp restriction section 112 so as to allow the seal 100 to be stamped. On the other hand, if the date of the seal surface does not coincide with the current date, the restriction put by the stamp restriction section 112 is maintained so as not to allow the seal 100 to be stamped.

Further, the date of the seal surface determined by the date reading section 114 may be transmitted to the workflow management device 300 via the communication section 106 and the PC 500, and may be recorded in the progress information DB 310.

Although the exemplary embodiment of the invention and modification examples thereof have been described thus far, they are only illustrative, and other different modifications may be conceivable. For example, in each of the above exemplary embodiment and modification examples, the form information 306 is provided from the workflow management device 300 to the form output device 400. However, the form output device 400 may have the form information 306. In this case, when the form output device 400 prints out a form, a request may be made to the workflow management device 300 for generation of a workflow instance associated with this form.

Further, in each of the above exemplary embodiment and modification examples, the seal 100 is stamped in the stamp field 202. However, even in a case where a user signs in the stamp field 202 using the pen 700 having the reading section 702, information concerning an operation progress can be similarly transmitted to the workflow management device 300.

Figure 22:
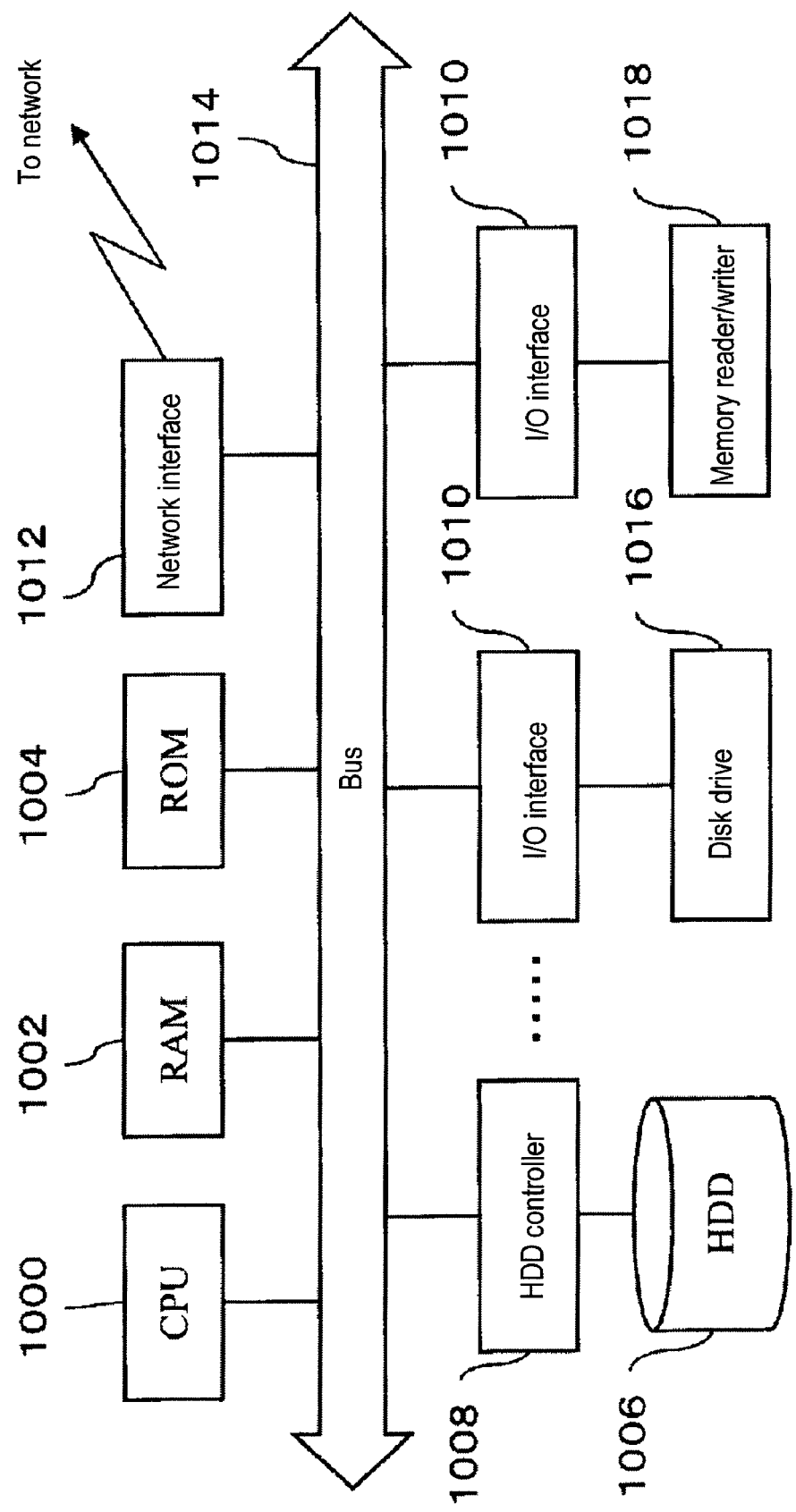
FIG. 22 is a diagram illustrating an example of a hardware configuration of a computer.

The workflow management device 300 and the PC 500 of each system that has been illustrated thus far is implemented, for example, by allowing a general-purpose computer to execute a program for performing a process of each functional module described above. In this case, the computer has a circuit configuration as hardware, for example, as illustrated in FIG. 22. As illustrated in FIG. 22, the circuit configuration of the computer is provided by connecting, via a bus 1014, for example, the following components: a microprocessor such as a CPU 1000; memories (primary storage) such as a random access memory (RAM) 1002 and a read only memory (ROM) 1004; an HDD controller 1008 for controlling an HDD (hard disk drive) 1006; various I/O (input/output) interfaces 1010; and a network interface 1012 for carrying out control for connection with a network such as a local area network. Further, via the I/O (input/output) interfaces 1010, for example, this bus 1014 may be connected with: a disk drive 1016 for reading and/or writing data from and/or to portable disk recording media such as a CD and a DVD; and a memory reader/writer 1018 for reading and/or writing data from and/or to portable non-volatile recording media with various specifications such as flash memories. Via recording media such as a CD and a DVD or via a communication line such as a network, the program in which processing contents of each functional module illustrated above are described is stored in a fixed storage device such as a hard disk drive, and is installed on the computer. The program stored in the fixed storage device is read into the RAM 1002 and executed by the microprocessor such as the CPU 1000, thus implementing the functional module group illustrated above. It should be noted that the functional module group may be partially or entirely formed as a hardware circuit such as a dedicated LSI (Large Scale Integration), an ASIC (Application Specific Integrated Circuit) or an FPGA (Field Programmable Gate Array).

What is claimed is:

1. An operation support system comprising:
a progress information providing unit that stores progress information indicating to which operation stage an operation procedure has progressed, and provides the progress information in response to a request made from an external device;
an entry device including an entry tool that makes an entry into a paper form associated with the operation procedure, and a reading device that, when an entry is made into an entry field of the paper form using the entry tool, reads identification information presented in the entry field; and
an updating unit that updates the progress information, which is stored in the progress information providing unit, based on an operation stage associated with the identification information, which is read from the entry field by the reading device,
wherein the entry tool is a seal.

2. The operation support system according to claim 1, wherein the reading device reads the identification information at a plurality of different positions outside of a seal surface of the seal, and
the updating unit determines the operation stage associated with the entry field, into which the entry is made using the entry tool, based on the progress information stored in the progress information providing unit, and
operation stages that are associated with the respective pieces of identification information read from the plurality of different positions, and
the updating unit updates, based on the determined operation stage, the progress information stored in the progress information providing unit.

3. The operation support system according to claim 1, further comprising: a stamp detection unit that detects that the seal is stamped, wherein
when the stamp detection unit has detected that the seal is stamped, the reading device reads the identification information.

4. The operation support system according to claim 1, further comprising: an stamp restriction unit that restricts the seal from being stamped until it is confirmed that the identification information is read by the reading device.

5. The operation support system according to claim 1, wherein the seal is a date seal including a date adjustment dial, and the entry device further includes a date determination unit that determines a date presented in a seal surface of the seal by reading the date adjustment dial, and a stamp restriction unit that restricts the seal from being stamped when the date determined by the date determination unit is not a current correct date.

6. The operation support system according to claim 1, wherein the identification information presented in the entry field of the paper form include information indicative of the operation procedure associated with the paper form, out of a plurality of operation procedures, and an operation stage associated with the entry field, and out of pieces of progress information of the plurality of operation procedures stored in the progress information providing unit, the updating unit updates the progress information of the operation procedure, which is indicated by the identification information read from the entry field by the reading device, based on the operation stage indicated by the identification information.

7. An operation support system comprising:
   a progress information providing unit that stores progress information indicating to which operation stage an operation procedure has progressed, and provides the progress information in response to a request made from an external device;
   an entry device including an entry tool that makes an entry into a paper form associated with the operation procedure, and a reading device that, when an entry is made into an entry field of the paper form using the entry tool, reads identification information presented in the entry field; and
   an updating unit that updates the progress information, which is stored in the progress information providing unit, based on an operation stage associated with the identification information, which is read from the entry field by the reading device,
   wherein the identification information presented in the entry field of the paper form includes information indicative of a coordinate on a position of the paper form, at which the identification information is presented, and
   the updating unit makes reference to information indicative of position ranges of the respective entry fields on the paper form, which are associated with the respective operation stages, and determines the operation stage associated with the entry field including the coordinate indicated by the identification information, which is read by the reading device.

8. The operation support system according to claim 7, wherein coordinate information indicative of the coordinate is presented on the paper form for each coordinate, the operation support system further comprising:
   a writing instrument including
   a pen,
   a coordinate reading device that reads the coordinate information adjacent to a pen point of the pen on the paper form;
   an acquisition unit that acquires, as additionally-written image information, a sequence of the coordinate information on the paper form, which are sequentially read by the coordinate reading device in conjunction with a writing operation performed using the pen, from the writing instrument; and
   an additionally-writing storage unit that stores the additionally-written image information acquired by the acquisition unit so as to associate the additionally-written image information with the operation stage determined by the updating unit based on the identification information, which is read by the reading device of the entry device in response to the writing operation.

* * * * *